US010977470B1

(12) United States Patent
Chang

(10) Patent No.: US 10,977,470 B1
(45) Date of Patent: Apr. 13, 2021

(54) TOUCH-PANEL CONTROL APPARATUS AND OPERATION METHOD THEREOF

(71) Applicant: Novatek Microelectronics Corp., Hsinchu (TW)

(72) Inventor: Tsen-Wei Chang, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/698,914

(22) Filed: Nov. 27, 2019

(51) Int. Cl.
*G06K 9/00* (2006.01)
*G06F 21/32* (2013.01)
*G06F 3/041* (2006.01)
*H04L 9/32* (2006.01)
*G06K 9/03* (2006.01)

(52) U.S. Cl.
CPC ....... *G06K 9/00013* (2013.01); *G06F 3/0416* (2013.01); *G06K 9/00335* (2013.01); *G06K 9/03* (2013.01); *H04L 9/3231* (2013.01)

(58) Field of Classification Search
CPC .... G06F 3/03547; G06F 3/0416; G06F 21/30; G06F 21/32; G06F 2203/0338; G06K 9/00; G06K 9/001; G06K 9/00013; G06K 9/03; G06K 9/00335; G06K 9/00006; G06K 9/00067; G06K 9/00073; G06K 9/0008; G06K 9/00919; G06K 9/00093; H04L 9/3231
See application file for complete search history.

(56) References Cited

U.S. PATENT DOCUMENTS

| | | | | |
|---|---|---|---|---|
| 9,467,848 | B1* | 10/2016 | Song | G06F 21/629 |
| 2005/0273621 | A1* | 12/2005 | Davis | G07C 9/257 |
| | | | | 713/182 |
| 2011/0074721 | A1* | 3/2011 | Goto | G06F 3/03547 |
| | | | | 345/173 |
| 2015/0067827 | A1* | 3/2015 | Lim | G06F 21/32 |
| | | | | 726/19 |
| 2016/0246396 | A1* | 8/2016 | Dickinson | G06F 3/0412 |
| 2017/0116454 | A1* | 4/2017 | Slaby | G06F 1/3262 |
| 2019/0098124 | A1* | 3/2019 | Guo | G06K 9/00013 |
| 2019/0362129 | A1* | 11/2019 | Sandhan | G06K 9/00 |
| 2020/0034032 | A1* | 1/2020 | Tanabe | G06F 3/04845 |

\* cited by examiner

*Primary Examiner* — Michael J Eurice
(74) *Attorney, Agent, or Firm* — JCIPRNET

(57) ABSTRACT

A touch-panel control apparatus and an operation method thereof are provided. The touch-panel control apparatus includes a fingerprint sensing circuit, a touch detection circuit, and an application processor. The fingerprint sensing circuit is coupled to a touch panel to sense a fingerprint of an object. The touch detection circuit is coupled to the touch panel to detect a touch behavior of the object on the touch panel. The application processor is coupled to the fingerprint sensing circuit and the touch detection circuit. The application processor is configured to enter an encryption mode to sense the fingerprint via the fingerprint sensing circuit. The application processor detects the touch behavior via the touch detection circuit in the encryption mode. When the touch behavior changes in the encryption mode, the application processor ends the encryption mode early.

11 Claims, 4 Drawing Sheets

TOUCH-PANEL CONTROL APPARATUS AND OPERATION METHOD THEREOF

BACKGROUND

Field of the Invention

The invention relates to a fingerprint sensing apparatus and more particularly, to a touch-panel control apparatus and an operation method thereof.

Description of Related Art

In a general mode, an application processor (AP) may detect a touch behavior of an object on a touch panel via a touch circuit. The AP may end the general mode and enter an encryption mode (i.e., a fingerprint recognition mode) according to a user's operation. During a sensing period of a fingerprint circuit, a conventional AP is operated in the encryption mode, so as to sense a fingerprint of the object on the touch panel via the fingerprint circuit. In anyway, during a period that the fingerprint circuit senses the fingerprint of the object, the touch behavior of the object may likely change, for example, a finger is moved abnormally. The change of the touch behavior may cause inaccuracy to a sensing result of the fingerprint.

In the encryption mode, the conventional AP may ignore data transmitted between the AP and the touch detection circuit, and thus, the conventional AP is incapable of reading a detection result of the touch circuit. Thus, during a period that the encryption mode is in operation, when the touch behavior of the object on the touch panel changes, for example, the finger is moved abnormally, the conventional AP does not know that the touch behavior has changed. In the unknowing situation, the conventional AP continuously performs the whole set of fingerprint sensing operation and does not exit the encryption mode until the fingerprint sensing operation is completed. After returning to the general mode from the encryption mode, the conventional AP may determine whether or not the touch behavior changes according to touch detection data of the touch circuit.

FIG. 1 is a schematic diagram illustrating operation mode switching of a conventional application processor. In FIG. 1, the horizontal axis represents the time, and an operation mode 100 illustrated in FIG. 1 includes a general mode CA and an encryption mode TA. In the general mode CA, the AP may detect a touch behavior of an object on a touch panel via a touch circuit. According to the operation of the user at a time point T1, the AP may end the general mode CA and enter the encryption mode TA (i.e., a fingerprint recognition mode). In the encryption mode TA, the AP may perform a plurality of rounds of the fingerprint sensing operations on the touch panel via the fingerprint circuit to obtain a plurality of fingerprint frames of the same object on the touch panel. For example, the AP may obtain two fingerprint frames in the encryption mode illustrated in FIG. 1.

In the example illustrated in FIG. 1, it is assumed that the user's finger (object) is pressed on the touch panel at the time point T1, this finger is transiently moved away from the touch panel at a time point T2, and this finger is again pressed on the touch panel at a time point T3. Namely, during the period that the fingerprint circuit senses the fingerprint of the object, the touch behavior of the finger (object) changes. This finger is transiently moved away from and returns to the touch panel the time point T2, which usually causes the finger to move abnormally. Apparently, the touch behavior changing at the time point T2 causes inaccuracy to a corresponding fingerprint frame. Thus, all the fingerprint frames obtained in the encryption mode TA illustrated in FIG. 1 are discarded.

In the operation period of the encryption mode TA, the conventional AP does not know that the touch behavior of the finger (object) has changed. In the unknowing situation, the conventional AP continuously performs the whole set of fingerprint sensing operation and does not exit the encryption mode TA until the fingerprint sensing operation is completed. After returning to the general mode CA from the encryption mode TA, the conventional AP may determine whether or not the touch behavior changes according to touch detection data of the touch circuit, so as to acquire whether the fingerprint frame is correct. If the conventional AP determines that the fingerprint frame corresponding to the time point T2 is incorrect, in order to obtain a correct fingerprint frame, the AP discards all the fingerprint frames and again enters the encryption mode to again perform the fingerprint sensing operation. Accordingly, a waiting time from the time point T2 to the time point that the encryption mode TA ends (at a time point T4) is a waste.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides a touch-panel control apparatus and an operation method thereof for saving a fingerprint sensing time when a touch behavior changes.

A touch-panel control apparatus of the invention includes a fingerprint sensing circuit, a touch detection circuit and an application processor. The fingerprint sensing circuit is coupled to a touch panel to sense a fingerprint of an object. The touch detection circuit is coupled to the touch panel to detect a touch behavior of the object on the touch panel. The application processor is coupled to the fingerprint sensing circuit and the touch detection circuit. The application processor is configured to enter an encryption mode to sense the fingerprint via the fingerprint sensing circuit. The application processor detects the touch behavior via the touch detection circuit in the encryption mode. When the touch behavior changes in the encryption mode, the application processor ends the encryption mode early.

An operation method of the invention includes: entering, by an application processor, an encryption mode to sense a fingerprint of an object on a touch panel via a fingerprint sensing circuit; detecting, by the application processor, a touch behavior of the object on the touch panel via a touch detection circuit in the encryption mode; and ending, by the application processor, the encryption mode early when the touch behavior changes in the encryption mode.

To sum up, the application processor of the embodiments of the invention can detect the touch behavior of the object on the touch panel via the touch detection circuit in the encryption mode. When the touch behavior of the object changes in the encryption mode, the application processor can end the encryption mode early. Thus, the touch-panel control apparatus can save the fingerprint sensing time when the touch behavior changes.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
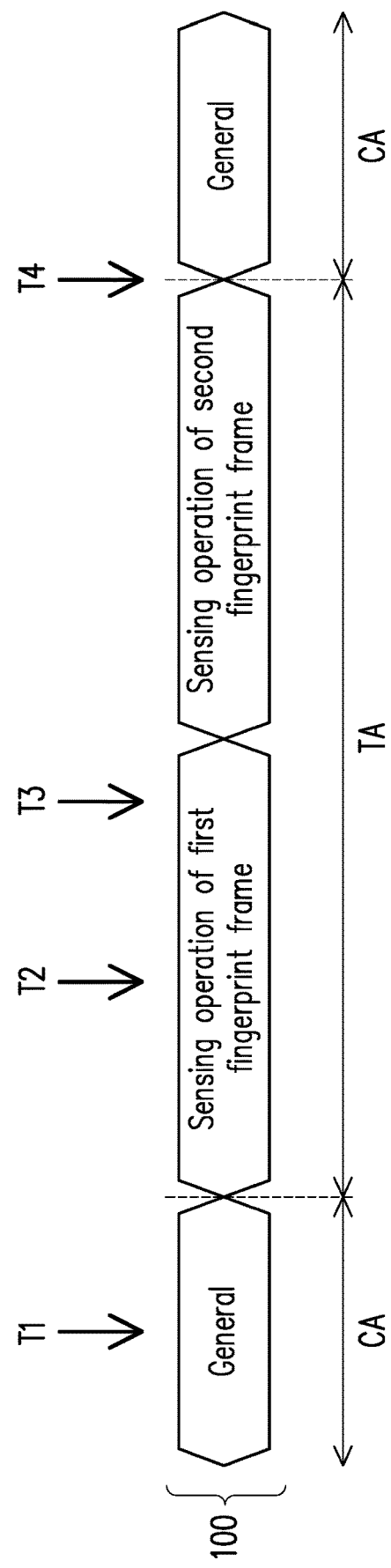
FIG. 1 is a schematic diagram illustrating operation mode switching of a conventional application processor.

The term "couple (or connect)" throughout the specification (including the claims) of this application are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/notations with the same reference numerals in different embodiments may be referenced to the related description.

Figure 2:
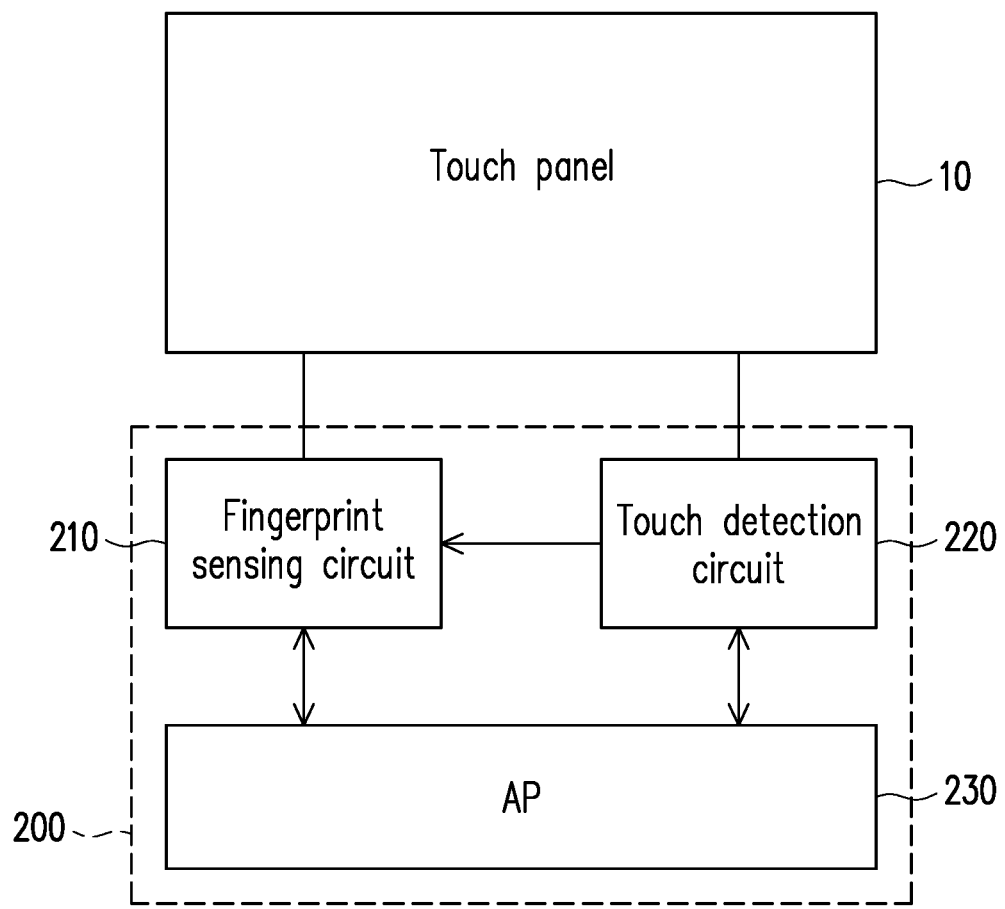
FIG. 2 is a schematic circuit block diagram illustrating a touch-panel control apparatus according to an embodiment of the invention.

FIG. 2 is a schematic circuit block diagram illustrating a touch-panel control apparatus 200 according to an embodiment of the invention. The touch-panel control apparatus 200 may control (drive) a display panel 10. Based on a design requirement, in some embodiments, the touch panel 10 may be a touch panel capable of fingerprint sensing and touch detection. In some other embodiments, the touch panel 10 may be a touch display panel capable of fingerprint sensing, touch detection and displaying.

The touch-panel control apparatus 200 illustrated in FIG. 2 includes a fingerprint sensing circuit 210, a touch detection circuit 220 and an application processor (AP) 230. The touch detection circuit 220 is coupled to the touch panel 10 to detect a touch behavior of an object (e.g., a user's finger) on the touch panel 10. Based on a design requirement, in some embodiments, the touch detection circuit 220 may be a conventional touch driving circuit or any other touch detection circuit. In a scenario that the touch panel 10 is a touch display panel, the touch detection circuit 220 may be a touch display driving circuit, for example, a touch with display driver integration (TDDI) circuit.

The AP 230 is coupled to the touch detection circuit 220 to receive a touch detection result. The AP 230 may detect the touch behavior of the object (e.g., the finger) on the touch panel 10 via the touch detection circuit 220 in a general mode. Specific contents related to "detecting the touch behavior of the object on the touch panel" may be set based on design requirements. For example, in some embodiments, the AP 230 may perform a conventional touch detection operation or other touch detection operations on the object on the touch panel 10 via the touch detection circuit 220 to detect a touch position of the object on the touch panel 10.

Figure 3:
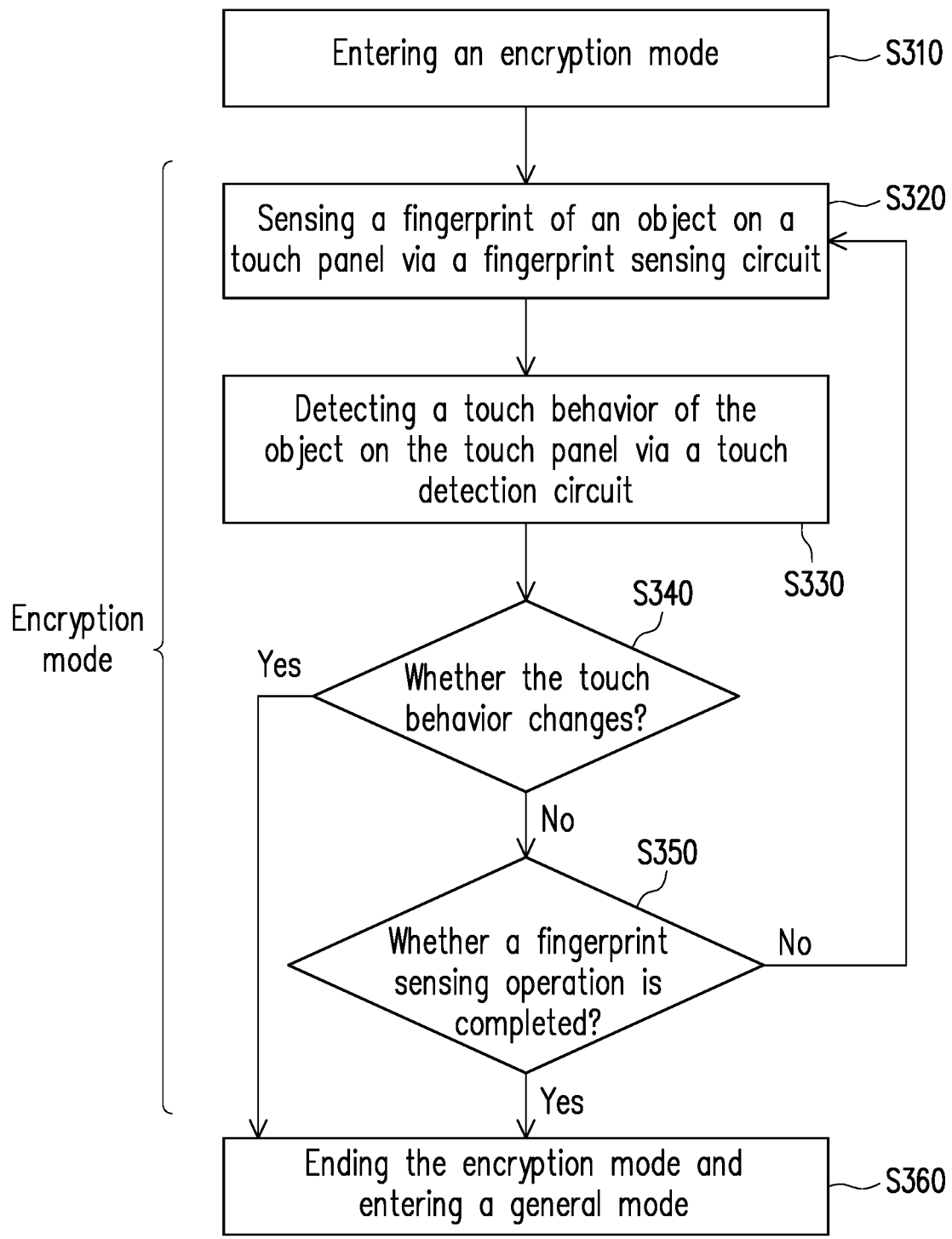
FIG. 3 is a flowchart illustrating an operation method of a touch-panel control apparatus according to an embodiment of the invention.

FIG. 3 is a flowchart illustrating an operation method of a touch-panel control apparatus according to an embodiment of the invention. Referring to FIG. 2 and FIG. 3, the fingerprint sensing circuit 210 is coupled to the touch panel 10 to sense a fingerprint of an object. The AP 230 is coupled to the touch detection circuit 210. The AP 230 enters an encryption mode TA (step S310), so as to sense a fingerprint of an object on the touch panel 10 via the fingerprint sensing circuit 210 (step S320). The AP 230 may detect a touch behavior of the object (e.g., a finger) on the touch panel 10 via the touch detection circuit 220 in the encryption mode (step S330).

In step S340, the AP 230 determines whether the touch behavior of the object (e.g., the finger) changes in the encryption mode. Specific contents that "the touch behavior changes" may be set based on design requirements. For example, the AP 230 may determine whether a position of the touch behavior of the object on the touch panel 10 changes. Specifically, the AP 230 may determine whether a variation amount of an X-axial position (and/or a Y-axial position) of the object on the touch panel 10 exceeds a certain threshold. When the variation amount of the X-axial position (and/or the Y-axial position) exceeds the threshold, the AP 230 may determine that the touch behavior of the object has changed. Moreover, for example, the AP 230 may determine whether a Z-axial position (e.g., a height or a pressing force) of the touch behavior of the object on the touch panel 10 changes. For example, the AP 230 may determine whether a variation amount of a touch area of the object on the touch panel 10 exceeds a certain threshold. When a variation amount of the Z-axial position (e.g., the variation amount of the touch area) exceeds the threshold, the AP 230 may determine that the touch behavior of the object has changed.

When the aforementioned touch behavior of the object on the touch panel 10 changes in the encryption mode TA (i.e., the determination result of step S340 is "No"), the AP 230 performs step S350. In step S350, the AP 230 determines whether a fingerprint sensing operation on the object (e.g., the finger) is completed. Specific contents related to the "fingerprint sensing operation" may be set based on design requirements. For example, in some embodiments, the AP 230 may perform a conventional fingerprint sensing operation or other fingerprint sensing operations on the object on the touch panel 10 via the fingerprint sensing circuit 210 to sense the fingerprint of the object on the touch panel 10.

When the fingerprint sensing operation on the object (e.g., the finger) is not yet completed (i.e., the determination result of step S350 is "No"), the AP 230 returns to step S320. When the fingerprint sensing operation on the object is completed (i.e., the determination result of step S350 is "Yes"), the AP 230 performs step S360. In step S360, the AP 230 ends the encryption mode TA and enters the general mode CA.

When the touch behavior of the object on the touch panel 10 changes in the encryption mode TA (i.e., the determination result of step S340 is "Yes"), the AP 230 performs step S360 to end the encryption mode TA early and enter the general mode CA. The AP 230 may detect the touch behavior of the object (e.g., the finger) on the touch panel 10 via the touch detection circuit 220 in the general mode CA. In the general mode CA, the AP 230 determines whether to again enter the encryption mode TA according to the touch behavior.

Figure 4:
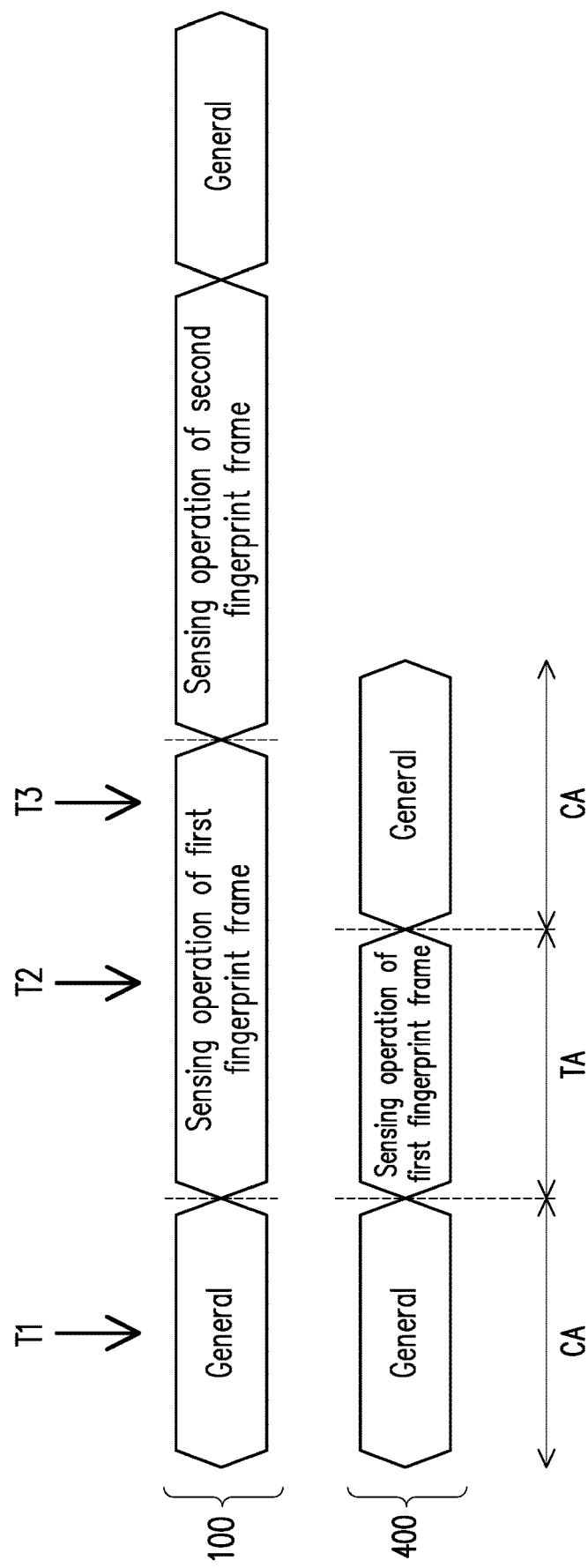
FIG. 4 is a schematic diagram illustrating operation mode switching of the application processor according to an embodiment of the invention.

FIG. 4 is a schematic diagram illustrating operation mode switching of the AP 230 according to an embodiment of the invention. In FIG. 4, the horizontal axis represents the time, and an operation mode 400 illustrated in FIG. 4 represents an operation mode of the AP 230 illustrated in FIG. 2. The operation mode 400 illustrated in FIG. 4 includes a general mode CA and an encryption mode TA. The general mode CA and the encryption mode TA illustrated in FIG. 4 may be inferred with reference to the descriptions related to the general mode CA and the encryption mode TA illustrated in FIG. 1 and thus, will not be repeated.

Similar to the example illustrated in FIG. 1, it is also assumed in the scenario illustrated in FIG. 4 that the user's finger (the object) is pressed on the touch display panel at the time point T1, this finger is transiently moved away from the touch display panel at the time point T2, and this finger is again pressed on the touch display panel at the time point T3. According to the operation of the user at the time point T1, the AP 230 may end the general mode CA and enter the encryption mode TA (i.e., a fingerprint recognition mode). In the encryption mode TA, the AP 230 may perform the fingerprint sensing operation on the touch panel 10 via the fingerprint sensing circuit 210 for multiple rounds, and the AP 230 may detect the touch behavior of the object (e.g., the finger) on the touch panel 10 via the touch detection circuit 220.

The touch behavior changing at the time point T2 may cause inaccuracy to a corresponding fingerprint frame. Thus, when the touch behavior of the object on the touch panel 10 changes in the encryption mode TA, the AP 230 may end the encryption mode TA early and enter the general mode CA. In comparison with the operation mode 100 illustrated in FIG. 1, the waiting time from the time point T2 to the time point that the encryption mode TA ends is effectively shortened by the operation mode 400 illustrated in FIG. 4.

In the embodiment illustrated in FIG. 2, the touch detection circuit 220 is coupled to the fingerprint sensing circuit 210. It is assumed in the application scenario illustrated in FIG. 2 that the AP 230 may ignore data transmitted between the AP 230 and the touch detection circuit 220 in the encryption mode TA (i.e., the AP 230 is incapable of reading the detection result of the touch detection circuit 220 in the encryption mode TA). When the aforementioned touch behavior on the touch panel 10 changes in the encryption mode TA, the touch detection circuit 220 may issue a "touch behavior abnormal notification" to the fingerprint sensing circuit 210. According to the touch behavior abnormal notification, the fingerprint sensing circuit 210 may end the sensing operation on the fingerprint early, and the fingerprint sensing circuit 210 notifies the AP 230 to end the encryption mode TA early.

In another embodiment, the AP 230 may read the data transmitted between the AP 230 and the touch detection circuit 220 in the encryption mode TA. Accordingly, when the touch behavior of the object changes in the encryption mode TA, the touch detection circuit 220 may directly issue the "touch behavior abnormal notification" (or the detection result of the touch) to the AP 230. The AP 230 may end the encryption mode TA early according to the touch behavior abnormal notification.

In yet another embodiment, when the touch detection circuit 220 directly issues the "touch behavior abnormal notification" (or the detection result of the touch) to the AP 230, i.e., the AP 230 ends the encryption mode TA, the AP 230 may further control the fingerprint sensing circuit 210 to end the sensing operation on the fingerprint early.

Based on different design demands, the blocks of the fingerprint sensing circuit 210, the touch detection circuit 220 and (or) the AP 230 may be implemented in a form of hardware, firmware, software (i.e., programs) or in a combination of many of the aforementioned three forms.

In terms of the hardware form, the blocks of the fingerprint sensing circuit 210, the touch detection circuit 220 and (or) the AP 230 may be implemented in a logic circuit on an integrated circuit. Related functions of the fingerprint sensing circuit 210, the touch detection circuit 220 and (or) the AP 230 may be implemented in the form of hardware by utilizing hardware description languages (e.g., Verilog HDL or VHDL) or other suitable programming languages. For example, the related functions of the fingerprint sensing circuit 210, the touch detection circuit 220 and (or) the AP 230 may be implemented in one or more controllers, microcontrollers, microprocessors, application-specific integrated circuits (ASICs), digital signal processors (DSPs), field programmable gate arrays (FPGAs) and/or various logic blocks, modules and circuits in other processing units.

In terms of the software form and/or the firmware form, the related functions of the fingerprint sensing circuit 210, the touch detection circuit 220 and (or) the AP 230 may be implemented as programming codes. For example, the fingerprint sensing circuit 210, the touch detection circuit 220 and (or) the AP 230 may be implemented by using general programming languages (e.g., C or C++) or other suitable programming languages. The programming codes may be recorded/stored in recording media, and the aforementioned recording media include, for example, a read only memory (ROM), a storage device and/or a random access memory (RAM). Additionally, the programming codes may be accessed from the recording medium and executed by a computer, a central processing unit (CPU), a controller, a micro-controller or a microprocessor to accomplish the related functions. As for the recording medium, a "non-transitory computer readable medium", such as a tape, a disk, a card, a semiconductor memory or a programming logic circuit, may be used. In addition, the programs may be provided to the computer (or the CPU) through any transmission medium (e.g., a communication network or radio waves). The communication network is, for example, the Internet, wired communication, wireless communication or other communication media.

Based on the above, in the encryption mode, the AP of the embodiments of the invention can detect the touch behavior of the object (e.g., the finger) on the touch panel via the touch detection circuit. When the touch behavior of the object changes in the encryption mode, the AP can end the encryption mode early (without waiting for the completion of the fingerprint sensing operation). Thus, the touch-panel control apparatus can save the fingerprint sensing time when the touch behavior changes.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A touch-panel control apparatus, comprising:
 a fingerprint sensing circuit, coupled to a touch panel to sense a fingerprint of an object;

a touch detection circuit, coupled to the touch panel to detect a touch behavior of the object on the touch panel; and an application processor, coupled to the fingerprint sensing circuit and the touch detection circuit, wherein the application processor is configured to enter an encryption mode to sense the fingerprint via the fingerprint sensing circuit, the application processor detects the touch behavior via the touch detection circuit in the encryption mode, and the application processor ends the encryption mode early when the touch behavior changes in the encryption mode.

2. The touch-panel control apparatus according to claim 1, wherein the touch panel is a touch display panel, and the touch detection circuit is a touch display driving circuit.

3. The touch-panel control apparatus according to claim 1, wherein after the application processor ends the encryption mode early, the application processor enters a general mode, the application processor detects the touch behavior via the touch detection circuit in the general mode, and the application processor determines whether to again enter the encryption mode according to the touch behavior in the general mode.

4. The touch-panel control apparatus according to claim 1, wherein the touch detection circuit is coupled to the fingerprint sensing circuit, the touch detection circuit issues a touch behavior abnormal notification to the fingerprint sensing circuit when the touch behavior changes in the encryption mode, and the fingerprint sensing circuit ends a sensing operation on the fingerprint early according to the touch behavior abnormal notification and notifies the application processor to end the encryption mode early.

5. The touch-panel control apparatus according to claim 1, wherein the touch detection circuit issues a touch behavior abnormal notification to the application processor when the touch behavior changes in the encryption mode, and the application processor ends the encryption mode early according to the touch behavior abnormal notification.

6. The touch-panel control apparatus according to claim 5, wherein when the application processor ends the encryption mode early, the application processor controls the fingerprint sensing circuit to end a sensing operation on the fingerprint early.

7. An operation method of a touch-panel control apparatus, comprising:

entering, by an application processor, an encryption mode to sense a fingerprint of an object on a touch panel via a fingerprint sensing circuit;

detecting, by the application processor, a touch behavior of the object on the touch panel via a touch detection circuit in the encryption mode; and ending, by the application processor, the encryption mode early when the touch behavior changes in the encryption mode.

8. The operation method according to claim 7, further comprising:

entering, by the application processor, a general mode after the application processor ends the encryption mode early;

detecting, by the application processor, the touch behavior via the touch detection circuit in the general mode; and determining, by the application processor, whether to again enter the encryption mode according to the touch behavior in the general mode.

9. The operation method according to claim 7, wherein the step of ending the encryption mode early comprises:

issuing, by the touch detection circuit, a touch behavior abnormal notification to the fingerprint sensing circuit when the touch behavior changes in the encryption mode;

ending, by the fingerprint sensing circuit, a sensing operation on the fingerprint early according to the touch behavior abnormal notification; and notifying, by the fingerprint sensing circuit, the application processor to end the encryption mode early.

10. The operation method according to claim 7, wherein the step of ending the encryption mode early comprises:

issuing, by the touch detection circuit, a touch behavior abnormal notification to the application processor when the touch behavior changes in the encryption mode; and ending, by the application processor, the encryption mode early according to the touch behavior abnormal notification.

11. The operation method according to claim 10, wherein the step of ending the encryption mode early further comprises:

controlling, by the application processor, the fingerprint sensing circuit to end a sensing operation on the fingerprint early when the application processor ends the encryption mode early.

* * * * *